(12) United States Patent
Hsu et al.

(10) Patent No.: US 10,963,651 B2
(45) Date of Patent: Mar. 30, 2021

(54) REFORMATTING OF CONTEXT SENSITIVE DATA

(71) Applicant: International Business Machines Corporation, Armonk, NY (US)

(72) Inventors: Yu-Ning Hsu, Taipei (TW); Elaine Ih Liao, Taipei (TW); Chih-Yuan Lin, New Taipei (TW); Cheng-Yu Yu, Taipei (TW)

(73) Assignee: International Business Machines Corporation, Armonk, NY (US)

( * ) Notice: Subject to any disclaimer, the term of this patent is extended or adjusted under 35 U.S.C. 154(b) by 562 days.

(21) Appl. No.: 14/731,528

(22) Filed: Jun. 5, 2015

(65) Prior Publication Data

US 2016/0357709 A1 Dec. 8, 2016

(51) Int. Cl.
| | |
|---|---|
| *G06F 40/58* | (2020.01) |
| *G06F 16/2455* | (2019.01) |
| *G06Q 50/00* | (2012.01) |
| *G06K 9/72* | (2006.01) |
| *G06K 9/32* | (2006.01) |
| *G06F 9/451* | (2018.01) |
| *G06Q 50/10* | (2012.01) |

(Continued)

(52) U.S. Cl.
CPC .......... *G06F 40/58* (2020.01); *G06F 3/04847* (2013.01); *G06F 9/454* (2018.02); *G06F 16/2455* (2019.01); *G06F 40/103* (2020.01); *G06F 40/151* (2020.01); *G06F 40/263* (2020.01); *G06F 40/279* (2020.01); *G06F 40/42* (2020.01); *G06K 9/00442* (2013.01); *G06K 9/3258* (2013.01); *G06K 9/72* (2013.01); *G06Q 50/01* (2013.01); *G06Q 50/10* (2013.01); *G06F 16/5846* (2019.01); *G06K 2209/01* (2013.01)

(58) Field of Classification Search
CPC ...... G06F 17/28; G06F 17/2785; G06F 19/18; G06F 16/3329; G06F 16/285; G06F 16/24; G06F 16/25; G06F 16/367; G06F 40/58

See application file for complete search history.

(56) References Cited

U.S. PATENT DOCUMENTS

| | | |
|---|---|---|
| 6,047,251 A | 4/2000 | Pon |
| 8,131,536 B2 | 3/2012 | Weischedel et al. |

(Continued)

OTHER PUBLICATIONS

IBM, List of IBM Patents or Patent Applications Treated as Related, Appendix P, dated Feb. 27, 2016, 2 pages.

(Continued)

*Primary Examiner* — Mariela Reyes
*Assistant Examiner* — Courtney Harmon
(74) *Attorney, Agent, or Firm* — Ewa M. Wozniak

(57) ABSTRACT

A method for dynamically detecting and converting a context-sensitive information in a first language and a first format to a second language and a second format that is understandable to an end user based on a user-specified setting is provided. The method may use a built-in camera of a computing device to dynamically detect and capture an image frame of context-sensitive information. The method may use Optical character recognition (OCR), as well as contextual information such as GPS data available from a mobile computing device, to automatically translate and reformat the context-sensitive information in real-time so a user may understand it unambiguously.

13 Claims, 8 Drawing Sheets

(51) Int. Cl.
    *G06F 40/42*     (2020.01)
    *G06F 40/103*     (2020.01)
    *G06F 40/151*     (2020.01)
    *G06F 40/263*     (2020.01)
    *G06F 40/279*     (2020.01)
    *G06F 3/0484*     (2013.01)
    *G06K 9/00*     (2006.01)
    *G06F 16/583*     (2019.01)

(56) References Cited

U.S. PATENT DOCUMENTS

| | | | |
|---|---|---|---|
| 8,725,490 | B2 | 5/2014 | Athsani et al. |
| 8,761,513 | B1 | 6/2014 | Rogowski et al. |
| 9,104,661 | B1 * | 8/2015 | Evans .............. G06F 17/28 |
| 9,342,233 | B1 | 5/2016 | Dimson |
| 9,355,336 | B1 | 5/2016 | Jahagirdar |
| 9,727,804 | B1 | 8/2017 | Lapointe |
| 2002/0184308 | A1 | 12/2002 | Levy |
| 2003/0095681 | A1 | 5/2003 | Burg |
| 2004/0015408 | A1 | 1/2004 | Rauen |
| 2005/0137845 | A1 | 6/2005 | Carroll |
| 2006/0074627 | A1 | 4/2006 | Moore |
| 2007/0140595 | A1 | 6/2007 | Taylor |
| 2008/0002916 | A1 | 1/2008 | Vincent |
| 2009/0048820 | A1 | 2/2009 | Buccella |
| 2009/0106016 | A1 | 4/2009 | Athsani |
| 2009/0192968 | A1 | 7/2009 | Tunstall-Pedoe |
| 2010/0268525 | A1 | 10/2010 | Kim |
| 2011/0090253 | A1 | 4/2011 | Good |
| 2011/0213670 | A1 * | 9/2011 | Strutton .............. G06Q 30/02 705/14.73 |
| 2012/0130704 | A1 | 5/2012 | Lee et al. |
| 2012/0330646 | A1 | 12/2012 | Andrade et al. |
| 2013/0166276 | A1 | 6/2013 | Raichelgauz |
| 2013/0174027 | A1 | 7/2013 | Atkin |
| 2013/0234945 | A1 | 9/2013 | Goktekin |
| 2013/0326347 | A1 * | 12/2013 | Albright .............. G06F 9/454 715/265 |
| 2014/0081634 | A1 * | 3/2014 | Forutanpour .......... G06F 17/289 704/235 |
| 2014/0279068 | A1 | 9/2014 | Systrom |
| 2014/0297754 | A1 | 10/2014 | Ross |
| 2014/0344213 | A1 * | 11/2014 | Kent .............. G06Q 50/01 707/608 |
| 2015/0269135 | A1 | 9/2015 | Kim |
| 2015/0278199 | A1 * | 10/2015 | Hazen .............. G06F 40/40 704/9 |
| 2015/0302084 | A1 * | 10/2015 | Stewart .............. G06F 16/358 707/776 |
| 2016/0148077 | A1 | 5/2016 | Cox |
| 2016/0188181 | A1 * | 6/2016 | Smith .............. G06F 3/0414 715/765 |

OTHER PUBLICATIONS

Pending U.S. Appl. No. 14/925,780, filed Oct. 28, 2015, Entitled: "Reformatting of Context Sensitive Data".

"Special Topics: Internationalization (I18N) | The Definitive Guide to Yii", http://www.yiiframework.com/doc/guide/1.1/en/topics.i18n, accessed Jun. 4, 2015, pp. 1-10.

Mell et al., "The NIST Definition of Cloud Computing", National Institute of Standards and Technology, Special Publication 800-145, pp. 1-7.

Whitney, "Google Aims to be Your Universal Translator", http://www.cnet.com/news/google-aims-to-be-your-universal-translator/, accessed Jun. 4, 2015. pp. 1-4.

Techterms, "Flat File", Accessed on May 3, 2019, 2 pages, https://web.archive.org/web/2014011034437/https://techterms.com/definition/flatfile.

http://checkcosmetic.net/, "Check your cosmetics!", Accessed on Aug. 18, 2020, pp. 1-4.

* cited by examiner

REFORMATTING OF CONTEXT SENSITIVE DATA

BACKGROUND

The present invention relates generally to the field of processing image data, and more particularly to real-time reformatting of a context-sensitive information.

A traveler visiting a different country or a region with a different culture or language may often need to be able to read and understand text written in a format different from that which the traveler may be familiar with, such as the expiry date of a food product, the price of a food item in a foreign currency, an abbreviation, a restaurant menu, a town or street sign, a book, a map, a train schedule, or a newspaper. While conventional real-time translation solutions available for use in mobile devices such as, for example, cellular phones may be able to translate a phrase in a foreign phrase to a language readable by the person, this translation alone may not be sufficient to remove ambiguity associated with a format that is context-sensitive. This is because different languages, social groups, locales, and cultures may often present information in a format different from that which the person may be familiar with, leading to ambiguity and confusion.

SUMMARY

According to an embodiment of the invention, a method for reformatting a text phrase is provided. The method captures a first text having a first format. The method then identifies a context of the first text based on the first format. The method then converts the first text from the first format to a second format associated with the context.

According to another embodiment of the invention, a computer program product for reformatting a text phrase is provided. The computer program product includes one or more computer-readable storage media and program instructions stored on the one or more computer-readable storage media. The computer program product includes program instructions to capture a first text having a first format. The computer program product also includes program instructions to identify a context of the first text based on the first format. The computer program product also includes program instructions to convert the first text from the first format to a second format associated with the context.

According to another embodiment of the invention, a computer system for reformatting a text phrase is provided. The computer system includes one or more computer processors, one or more computer-readable storage media, and program instructions stored on the computer-readable storage media for execution by at least one of the one or more processors. The computer system includes program instructions to capture a first text having a first format. The computer system also includes program instructions to identify a context of the first text based on the first format. The computer system also includes program instructions to convert the first text from the first format to a second format associated with the context.

BRIEF DESCRIPTION OF THE SEVERAL VIEWS OF THE DRAWINGS

The following detailed description, given by way of example and not intended to limit the invention solely thereto, will best be appreciated in conjunction with the accompanying drawings, in which.

The drawings are not necessarily to scale. The drawings are merely schematic representations, not intended to portray specific parameters of the invention. The drawings are intended to depict only typical embodiments of the invention. In the drawings, like numbering represents like elements.

DETAILED DESCRIPTION

Figure 1:
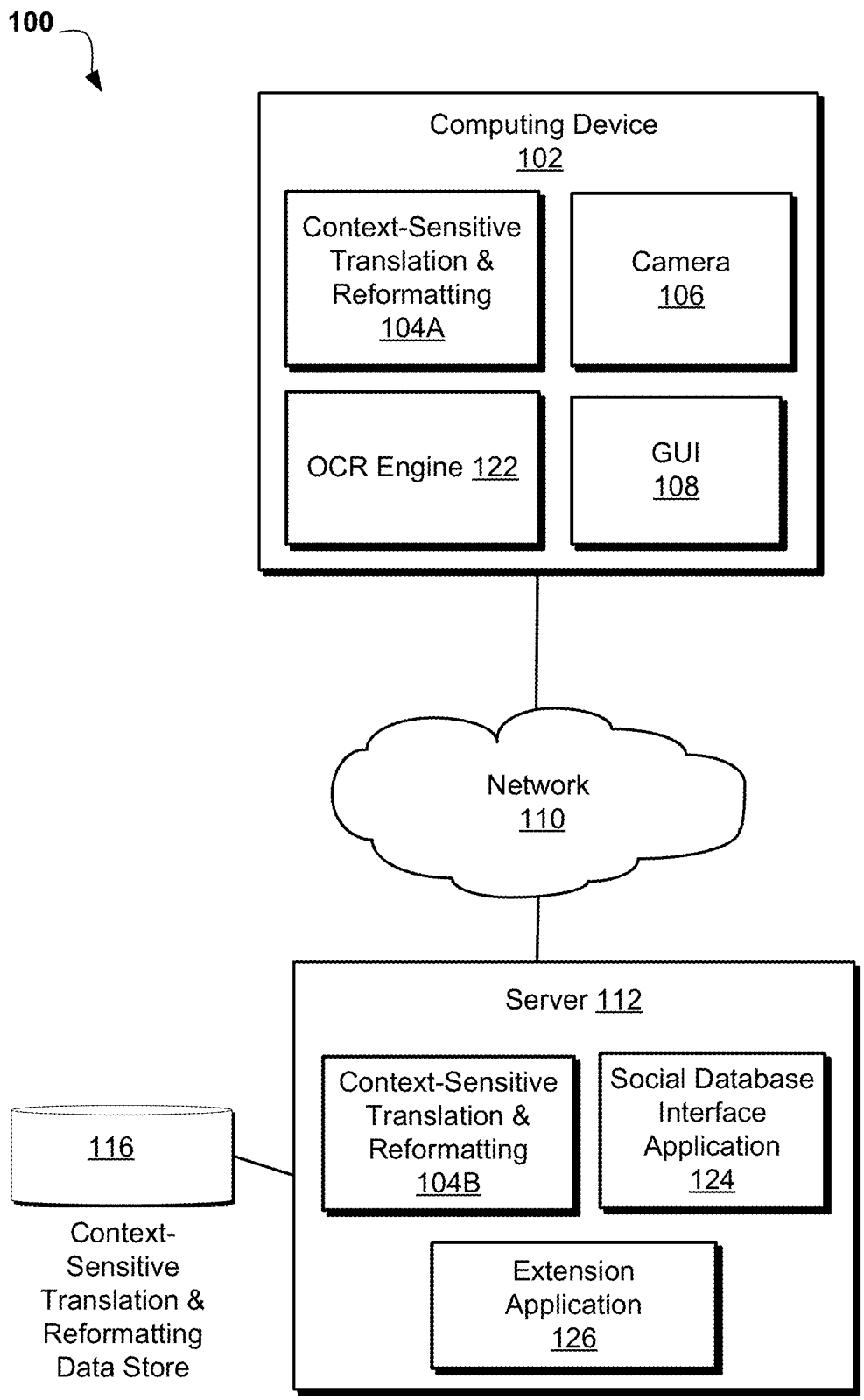
FIG. 1 is a functional block diagram illustrating a context-sensitive translation and reformatting environment, in accordance with one embodiment of the present invention.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with one embodiment, it is submitted that it is within the knowledge of one skilled in the art to affect such feature, structure, or characteristic in connection with other embodiments whether or not explicitly described.

A traveler visiting a different country or a region with a different culture or language may often need to be able to read and understand text written in a format different from that which the traveler may be familiar with, such as the expiry date of a food product, the price of a food item in a foreign currency, an abbreviation, a restaurant menu, a town or street sign, a book, a map, a train schedule, or a newspaper, While conventional real-time translation solutions available for use in mobile devices such as, for example, cellular phones may be able to translate a phrase in a foreign phrase to a language readable by the person, this translation alone may not be sufficient to remove ambiguity associated with a format that is context-sensitive. This is because different languages, social groups, locales, and cultures may often present information in a format different from that which the person may be familiar with, leading to ambiguity and confusion. For example, one thousand may be formatted as 1,000 (comma is used as the thousandth place separator) in the U.S. while it may be formatted as 1.000, with a dot being used as the thousandth place separator in the German language. Similarly, Nov. 4, 2012 may be displayed as 11/4/12 in the U.S. and as 12-11-4 in Canada. Likewise, aspects such as a currency symbol, measurement, time presentation, number, sign, abbreviation, color, icon, etc. too may be formatted differently in different cultures, social group settings, languages, locales, or countries. Without awareness of such format differences, a person in an unfamiliar locale may misinterpret context-sensitive information translated by conventional translation solutions due to variations in formatting.

It may be beneficial to provide an application that utilizes the camera and display capabilities of prevalent computing devices such as, for example, cell phones to dynamically detect, translate, and reformat the context-sensitive information that includes a context-sensitive format, and present it in a form that's most understandable to an end user based on the end user-specified setting, as selected in the mobile device or in a mobile application.

Embodiments of the present invention may dynamically detect and convert a context-sensitive information on an object in a first language and a first format to a second language and a second format in real-time. Embodiments of the invention may use a built-in camera of a computing device to dynamically detect and capture an image frame of context-sensitive information that a user needs help with translation and reformatting and/or obtaining additional information on. Embodiments of the present invention may perform optical character recognition (OCR) on the captured image frame of the context-sensitive information containing a context-sensitive format to automatically translate and then reformat in real-time into a language and format that may be unambiguously understood by the user.

Embodiments of the invention may use context-sensitive information surrounding the object/phrase/word being translated and reformatted such as, for example, GPS (global positioning satellite) location data available from a user's mobile computing device, or other user-specified settings, in performing the translation and reformatting. In situations where only reformatting may be needed and translation may not be needed, embodiments of the present invention may only perform a reformatting of the context-sensitive information.

Embodiments of the present invention may display the translated and reformatted text in augmented reality format that may include an original context and an original background, and proximate the display of the original context-sensitive information. In instances where embodiments of the inventions may not be able to provide adequate translation and/or reformatting services based on a first captured image due to insufficient information available from an existing knowledge database accessed by it, embodiments of the present invention may guide a user to capture images of additional context-sensitive information within a defined proximity of the first captured image object such as labels, logos, or certain parts of a product and upload the same to one or more social networks to identify and clarify ambiguous information. Embodiments of the invention may also operate on digital devices other than mobile devices such as, for example, laptop computers, handheld computers, and other computerized appliances.

As used herein, the term "context-sensitive information" refers to information that includes items such as a location, format, abbreviation, sign, color, icon, currency symbol, date, time, cosmetic product batch number, notation specific to a social group, and metadata associated with the first text, etc. that may have different representations in different cultural contexts and in different locales. The term may also denote information that includes conventions practiced by a group of people with similar interests, belief systems, fraternities, or similar other attributes. For example, people in the domain of music may use "pp" to represent "pianissimo" (meaning "very soft") which may not be understandable to people not familiar with music dynamics. Another example is the "best before" date representation on a cosmetics product or a batch number imprinted on the cosmetic product which may imply different connotations for different cosmetic brands.

As used herein, the term "first language" refers to the language of a text that is translated by a camera device of a computing device using one embodiment of the present invention.

As used herein, the term "second language" means the language in which the translation of the text is displayed by a camera device of a computing device using one embodiment of the present invention. The translation in the second language may be displayed as an augmented reality image on the camera device.

As used herein, the term "translation" refers to a translation of a first language text into a second language text. In this context, the term "translation" means a process for rendering a text of a first language into a text of a second language having the same meaning. The translated text communication of the second language may be read by the user on the display of the camera device of a computing device.

As used herein, the term "first format" refers to the format of a text that is reformatted by a camera device of a computing device using one embodiment of the present invention.

As used herein, the term "second format" means the format in which the translated text is displayed by a camera device of a computing device using one embodiment of the present invention. The reformatting to the second format may be based on a user-specified setting. The reformatted text in the second language may be displayed as an augmented reality image on the camera device.

As used herein, the term "reformatting" refers to a format conversion, more particularly to a language text reformatting from a first format to a second format. In this context, the term "reformatting" means a process for rendering a word text of a first language into a word text of a second language having the same meaning with a different format that is unambiguously understandable by a user. The reformatted text in the second language may be read by the user on the display of a camera device of a computing device.

As used herein, "augmented reality" means a computer-mediated reality through the use of a computing device such as a smartphone, wherein the computer is used to add or subtract information from, or otherwise manipulate one's perception of reality. Typically, it is the user's visual perception of the environment that is mediated. This is done through the use of some kind of electronic device, such a smartphone, which can act as a visual filter between the real world and what the user perceives.

As used herein, "real-time" means in real-time or near real-time, where the user can view the reformatted translation in a threshold amount of time that is relatively recent, and without a significant time delay. Real-time does not necessarily mean instantaneously in the mathematical or physical sense, but only appears instantaneously to the user.

The present invention will now be described in detail with reference to the figures. All brand names and/or trademarks used herein are the property of their respective owners.

FIG. 1 is a functional block diagram illustrating an exemplary context-sensitive translation & reformatting environment 100 for developing context-sensitive translations and reformatting of scanned context-sensitive information from a foreign language (hereinafter "first language") and a foreign format (hereinafter "first format") to a native language (hereinafter "second language") and a context-sensitive native format (hereinafter "second format") that is unambiguously understandable by a user of the embodiments of the invention. In various embodiments of the present invention, context-sensitive translation & reformatting environment 100 may include a computing device 102 and a server 112, connected over network 110.

It should be appreciated that FIG. 1 provides only an illustration of one implementation and does not imply any limitations with regard to the environments in which different embodiments may be implemented. Many modifications to the depicted environments may be made based on design and implementation requirements.

The network 110 represents a worldwide collection of networks and gateways, such as the Internet, that use various protocols to communicate with one another, such as Lightweight Directory Access Protocol (LDAP), Transport Control Protocol/Internet Protocol (TCP/IP), Hypertext Transport Protocol (HTTP), Wireless Application Protocol (WAP), etc. Network 110 may also include a number of different types of networks, such as, for example, an intranet, a local area network (LAN), or a wide area network (WAN).

Computing device 102 represents a network connected user computing device on which user input will be monitored and recorded, in accordance with various embodiments of the invention. The computing device 102 may be, for example, a mobile device, a smart phone, a personal digital assistant, a netbook, a laptop computer, a tablet computer, or any type of computing device capable of running a program and accessing a network, in accordance with one or more embodiments of the invention. Computing device 102 may include computer-readable storage media and other internal and external hardware components, as depicted and described in further detail below with reference to local computing devices 54A-N in a cloud computing environment, as described in relation to FIGS. 6, 7, and 8, below. In one embodiment, system components within computing device 102, for example, memory 28 and RAM 30 (FIG. 6), may include read-only registers and/or other data stores that contain device, network ID, GPS location information, user, active user program, system date/time, user-specified language and context-sensitive format settings, and other system and user information that may be accessible, for example, by application programming interfaces (APIs). Computing device 102 may also support image capture, for example, by one or more proprietary or open source image capture APIs.

In one embodiment, the computing device 102 may include a camera 106, a graphical user interface (GUI) 108, an OCR engine 122, and optionally, a context-sensitive translation & reformatting 104A. Camera 106 represents an image capture device. In an exemplary embodiment, camera 106 may be, for example, an image capturing device that captures digital images and interfaces with a network application such as context-sensitive translation & reformatting 104B on server 112, which will be explained later, or interfaces with a local application residing on computing device 102, such as context-sensitive translation & reformatting 104A and OCR engine 122, to be explained later. Camera 106 may accept user input from various human interface devices (HIDs) such as a computer mouse, a keyboard, a touchscreen, audio input, etc. In various embodiments, Camera 106 may support image capture, for example, by one or more proprietary or open source image capture APIs. It should be noted that, in an embodiment, camera 106 may be not be a part of, but separate from, computing device 102.

GUI 108 represents an interface that accepts user input. In an exemplary embodiment, GUI 108 may be, for example, an application that includes a display device and which accepts user input and interfaces with a network application, such as context-sensitive translation & reformatting 104B on server 112, both described in more detail below, or interfaces with a local application residing on computing device 102, such as context-sensitive translation & reformatting 104A, described in more detail below. In other embodiments, GUI 108 may represent an interface that is integral to a local application residing on computing device 102, such as context-sensitive translation & reformatting 104A. GUI 108 may accept user input from various human interface devices (HIDs) such as a computer mouse, a keyboard, a touchscreen, audio input, etc.

OCR engine 122 represents an optical character recognition (OCR) program known in the art that translates images of characters into a standard encoding scheme, such as for example, characters translated in ASCII or Unicode. In order to process an image captured by camera 106, data in the captured image may need to be translated into some meaningful form, and OCR engine 122 provides services associated with converting the data into text that could be translated and/or reformatted, as applicable. In an exemplary embodiment, OCR engine 122 may represent an application residing locally on computing device 102 that accepts digital images from camera 106 and transmits associated information to context-sensitive translation & reformatting 104A and 104B, to be explained later, for further processing. In one embodiment, several OCR engines may be deployed to extract context-sensitive information that may include formats unique to a given locale from images captured by camera 106 that include context-sensitive information.

Server 112 represents a network platform that hosts social database interface application 124, and optionally, extension application 126, and associated context-sensitive translation & reformatting data store 116, and optionally context-sensitive translation & reformatting 104B, all of which will be explained later. Server 112 may be, for example, a netbook, a laptop computer, a tablet computer, a desktop computer, or any type of computing device capable of running a program and accessing a network. Server 112 may represent, for example, a network computing device 54A-N in a cloud computing environment, as described in relation to FIGS. 6, 7, and 8, below.

Social database interface application 124 represents an interface that context-sensitive translation & reformatting 104A and 104B, and a user uses interact with a social network or a social database. A social network can refer to a computer network connecting entities, such as people or organizations, by a set of social relationships, such as friendship, co-working, or a community representing a group of members sharing common interests or characteristics. The social network may foster relationships between its members, thereby offering a higher level of affiliation and trust than other online media through which users can interact with each other such as electronic message boards or forums. The social network may seek and capture inputs regarding context-sensitive formats from a plurality of users on the social network. Social network may also refer to a computer application or data connecting such entities by such social relationships. Social network may provide an avenue for users to post information and respond to queries related to context-sensitive formats. A social database may refer to a database that saves records of context-sensitive formats accumulated from social collaborative knowledge with users contributing new context-sensitive format information.

Extension application 126 represents an application that augments translating & reformatting functions offered by various embodiments of the invention. In an exemplary embodiment, extension application 126 may represent an application that may, on detecting a context-sensitive information that includes, for example, a context-sensitive price tag in a foreign language, interact with context-sensitive translation & reformatting 104A and 104B to convert the identified price to a currency familiar to a user based on the latest exchange rate before the results are displayed on the screen of the mobile device. In one embodiment, extension application 126 may represent an application that may permit a user to select whether both translating and reformatting services are needed or only one of the two services is needed. In one embodiment, during the translation and reformatting process, extension application 126 may interact with context-sensitive translation & reformatting 104A and 104B in facilitating a user to upload answers to pre-existing unanswered questions related to a yet to be identified input locale formats present in context-sensitive information captured by camera 106. In this mode, extension application 126 may permit a user to include explanations that may enhance the domain knowledge database containing context-sensitive formats.

Context-sensitive translation & reformatting data store 116 represents a database that includes information associated with translating and reformatting of context-sensitive information. In one embodiment, context-sensitive translation & reformatting data store 116 may interact with social networks and social databases available on the worldwide web through social database interface application 124 to collect and index context-sensitive formats associated with various input locales. In one embodiment, context-sensitive translation & reformatting data store 116, through social database interface application 124, may represent a gateway to a context-sensitive domain knowledge database such as, for example, a common locale data repository (CLDR) consisting of the world's languages that may include formatting conventions used by different languages and locales. In one embodiment, context-sensitive translation & reformatting data store 116 may represent a database that includes organized collection of data containing information corresponding to contextual data such as, for example, a current GPS location data of computing device 102. In one embodiment, context-sensitive translation & reformatting data store 116 may represent a database that contains a listing of all databases available on the worldwide web that contain information related to translating and reformatting of context-sensitive information. In one embodiment, context-sensitive translation & reformatting data store 116 may be populated with information associated formatting conventions via manual user entry through a user interface on computing device 102 or from other means such as by automatic periodic data transfers from another online database. In an exemplary embodiment, context-sensitive translation & reformatting data store 116 is stored locally on server 112, however in other embodiments, context-sensitive translation & reformatting data store 116 may be located remotely and accessed via a network such as network 110.

Context-sensitive translation & reformatting 104A and 104B together operate to capture, identify, translate and reformat context-sensitive information detected on an image captured by camera 106 and display the translated and reformatted information as an augmented reality image in real-time. It should be noted that context-sensitive translation & reformatting 104A and 104B may run on computing device 102 or on server 112.

Figure 2A:
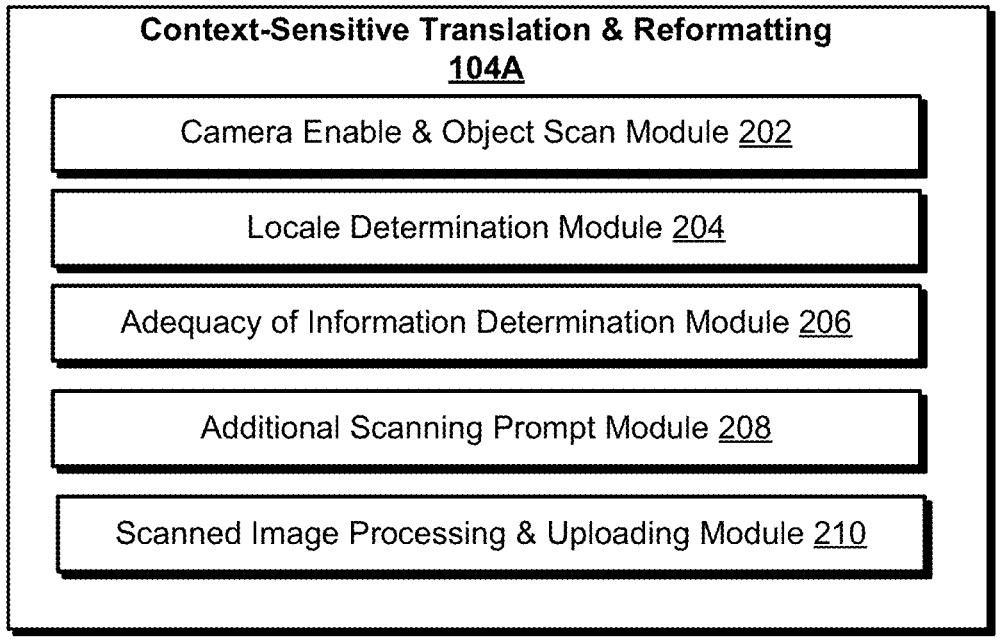
FIGS. 2A and 2B are functional block diagrams illustrating the context-sensitive translation and reformatting program, in accordance with one embodiment of the present invention.
Figure 2B:
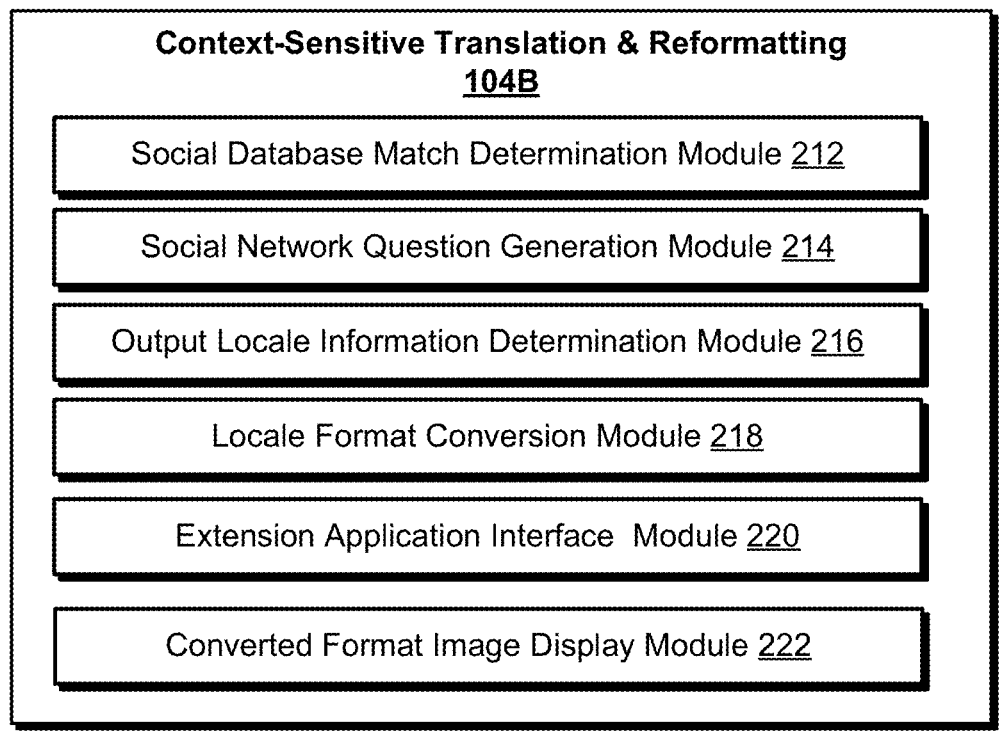

FIGS. 2A and 2B are functional block diagrams depicting components of context-sensitive translation & reformatting 104A and 104B, in accordance with one embodiment of the present invention that corresponds to context-sensitive translation & reformatting 104A and 104B of FIG. 1. Component modules that form part of context-sensitive translation & reformatting 104A may include: camera enable & object scan module 202, locale determination module 204, adequacy of information determination module 206, additional scanning prompt module 208, and scanned image processing & uploading module 210. Component modules that form part of context-sensitive translation & reformatting 104B may include: social database match determination module 212, social network question generation module 214, output locale information determination module 216, locale format conversion module 218, extension application interface module 220, and, converted format image display module 222.

Camera enable & object scan module 202 may enable GUI 108, camera 106, and OCR engine 122 to capture context-sensitive information. Locale determination module 204 may determine a source locale or cultural group associated with the captured context-sensitive information based on factors including context, locale, language, GPS data, user input, and context-sensitive format information available on or through context-sensitive translation & reformatting data store 116. Adequacy of information determination module 206 may determine whether information extracted by locale determination module 204 is adequate for translating and reformatting of context-sensitive information. Additional scanning prompt module 208 may prompt capturing of additional context-sensitive information such as a label, logo, or part of a product if adequacy of information determination module 206 determines that the extracted information is inadequate. The scanned image processing & uploading module 210 may process and transfer the additional images captured by additional scanning prompt module 208 to social networks and social databases via social database interface application 124.

Social database match determination module 212 may determine whether a match exists in a social database or a social network to the additionally captured and processed context-sensitive information. The social network question generation module 214 may create a new query on a social network when social database match determination module 212 determines that a match does not exist. The output locale information determination module 216 may determine a second format in which the translation output is to be displayed on GUI 108 (FIG. 1). The locale format conversion module 218 may convert the context-sensitive information from a first language and a first format to a second language and a second format. The extension application interface module 220 may provide additional enhancements to the translated and reformatted context-sensitive information. The converted format image display module 224 may display an image that includes context-sensitive information translated and reformatted into a second language and a second format.

Figure 3:
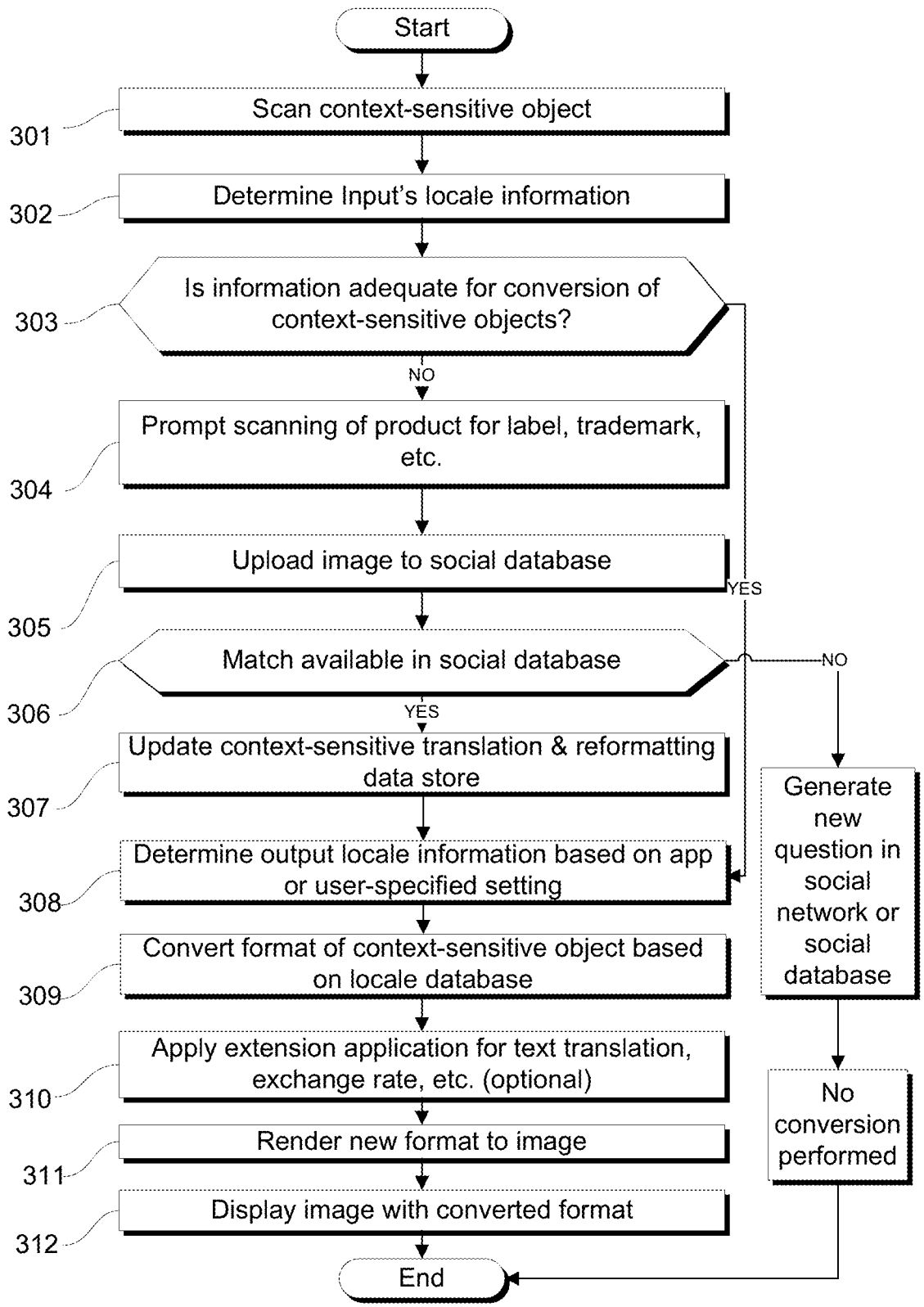
FIG. 3 is a flowchart depicting operational steps of the context-sensitive translation and reformatting program, in accordance with one embodiment of the present invention.
Figure 4A:
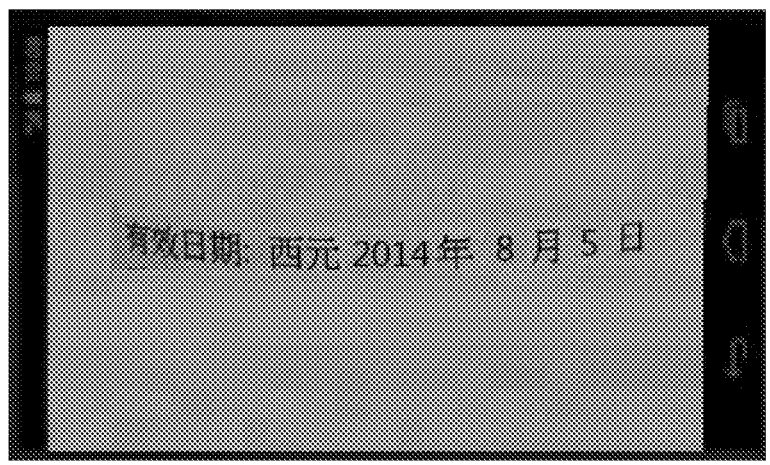
FIGS. 4A, 4B and 4C are diagrams showing how text from a real world image may be processed for use in the methods of the present invention, in accordance with one embodiment of the present invention.
Figure 4B:
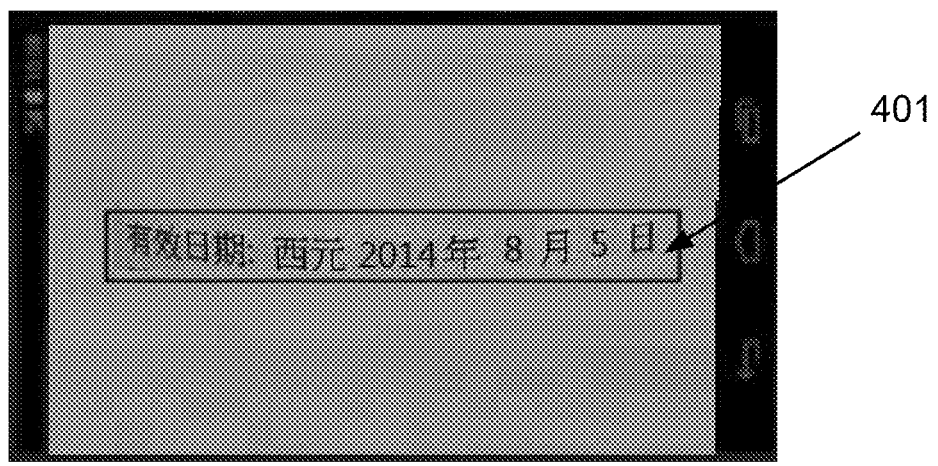
Figure 4C:
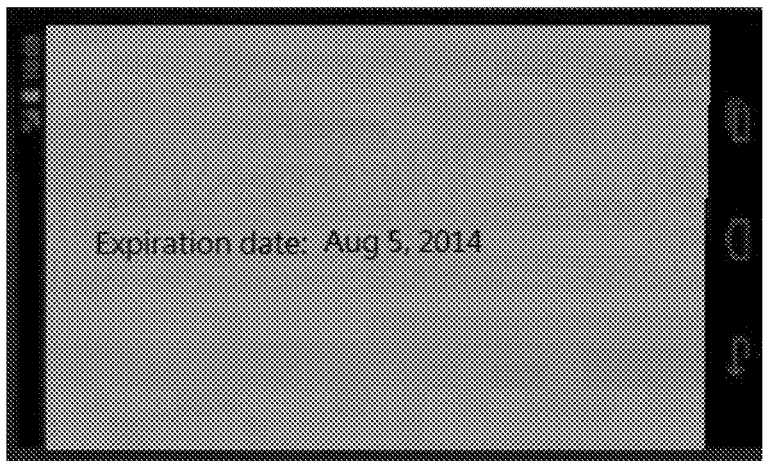

FIG. 3 is a flowchart depicting operational steps of context-sensitive translation & reformatting 104A and 104B, in accordance with one embodiment of the present invention. Steps depicted in FIG. 3 may be implemented using one or more modules of a computer program such as, for example, context-sensitive translation & reformatting 104A and 104B, and executed by a processor of a computer such as computing device 102 or server 112. FIG. 3, in conjunction with FIGS. 4A, 4B and 4C may be used to describe operations of context-sensitive translation & reformatting 104A and 104B in various embodiments. FIGS. 4A, 4B and 4C represent translation and reformatting of a real world image from Chinese language to English language, according to one embodiment of the present invention.

At 301, context-sensitive translation & reformatting 104A may be initiated by a user seeking to translate and reformat a context-sensitive information on an object in a first language and a first format to a second language and a second format. Following the initiation, camera enable & object scan module 202 module (FIG. 2) may capture and process context-sensitive information on the object as follows. Camera enable & object scan module may prompt a user via GUI 108 to position a camera target box view of camera 106 on the context-sensitive information on the object that is to be translated and/or reformatted. In an exemplary embodiment, the captured image may represent an expiration date in the Chinese language with date format specific to the Chinese language as depicted in FIG. 4A. The camera target box view 401 of camera 106 may be positioned to cover the text as shown in FIG. 4B. Once a digital image of the context-sensitive information within the target box is captured by camera 106, camera enable & object scan module 202 may use OCR engine 122 to process the image for text strings using image processing and optical character recognition (OCR) software. OCR engine 122 may receive the image and perform character recognition on the image to identify a text present within the image to generate a recognized character string that includes the first text.

The text data derived from the image by OCR engine 122 may be machine readable as character data, as opposed to being data in the form of image data. In one embodiment, OCR engine 122 may extract a first text from the image-derived text data that may be in the form of ASCII text data. At 302, locale determination module 204 may commence services associated with determining a first language and a first format associated with the first text based on contextual elements including environment, locale, language, GPS data, user input, and context-sensitive format information available on or through context-sensitive translation & reformatting data store 116 (FIG. 1). In one embodiment, locale determination module 204 may access a database that includes records of context-sensitive formats and other context-sensitive information. The database may be capable of identifying a context of the first text based on a first format and providing a second format that corresponds to the first format present in the first text. In addition, the database may be capable of identifying a first language of the first text and translating it to a second language. In one embodiment, context-sensitive translation & reformatting data store 116 may represent the database that identifies the first language and the first format present in the first text based on a context identified in the first text, and as will be described later, translates and reformats the first text into a second language and a second format.

It should be noted that sometimes a first format (in whole or in part) associated with a context-sensitive information may be inherent in the image-derived text data itself. In other cases, the first format (in whole or in part) may be inherent in a portion of the captured image which is in proximity to the portion of a raw image data from which the text was derived. In other cases, the first format (in whole or in part) may be derived from portions of the captured image that are remote from the portion of the raw image data from which the image-derived text was derived by OCR engine 122. In other cases, the first format may be completely separate from the raw image data. For example, in one embodiment, color contrast between the text and its surroundings may supply information regarding the input locale that context-sensitive translation & reformatting 104A and 104B use to adduce a first format and a first language of the input locale. As an example, where the image-derived text data is extracted from a bright green sign in the raw image data that has the text in a bright, high contrast white color with the bright green sign being cropped closely around the text in the raw image data, context-sensitive translation & reformatting 104A and 104B may adduce the information related to the first format inherent in the text being recognized to be a residential area street sign.

In one embodiment where a GPS location information of computing device 102 is captured by context-sensitive translation & reformatting 104A and 104B at an instant when the raw image is captured by camera 106, the GPS location information may represent contextual information that context-sensitive translation & reformatting 104A and 104B use to adduce the first format information associated with the input locale. It should be noted that this particular type of contextual information is not present in the raw image data itself, but, rather, is metadata which is separate from, but still related to, the image. In various embodiments, the GPS location information can be very useful in determining symbolic denotation(s) of the characters recognized by the OCR engine 122. For example, an image-derived text and GPS co-ordinates of computing device 102 at the instant when the raw image is captured by camera 106 may be sent to social database match determination module 212 over network 110 to assist in identifying a first format associated with the input locale. In an exemplary embodiment depicted in FIG. 4B, locale determination module 204 may, using current GPS location data of computing device, determine the data captured in FIG. 4B to possibly include a first language of the Chinese language and a date in a first format present within the data that is unique to the Chinese language.

At 303, adequacy of information determination module 206 may receive the output of locale determination module 204 and determine whether the received information is adequate for conversion of context-sensitive information from the first format to a second format. Adequacy of information determination module 206 may access information available on or through context-sensitive translation & reformatting data store 116 in determining whether the received information is adequate. There may be occasions when context associated with the context-sensitive information received by locale determination module 204 and transferred to adequacy of information determination module 206 may be insufficient for determining a first format associated with it.

If and when adequacy of information determination module 206 determines that the captured information is inadequate to accurately determine the first format, at 304, additional scanning prompt module 208 may prompt the user via GUI 108 (FIG. 1) to capture additional image(s) of additional context-sensitive information within a defined proximity of the first captured image and the first text such as a label, logo, part of a product, other distinct marks, etc. After camera 106 captures the additional image(s), at 305, scanned image processing & uploading module 210 may upload the additional image processed by additional scanning prompt module 208 to social database match determination module 212.

Alternately, if at 303, adequacy of information determination module 206 finds the output of locale determination module 204 to be adequate, it may, at 308, transfer the same to output locale information determination module 216.

At 306, social database match determination module 212 may receive the output of scanned image processing & uploading module 210. Social database match determination module 212 may then access an online social database to search and find one or more texts having formats matching the first format of the first text. In instances where additional labels and logos have been captured and delivered to social database match determination module 212, the module may search the social database to find one or more of labels and/or logos matching those in the additionally captured image to identify a first context corresponding to the one or more matching labels and logos, and determine the context of the first text based on the first context corresponding to the one or more matching labels and logos. Social database match determination module 212 may interface with social database interface application 124 and context-sensitive translation & reformatting data store 116 in locating a first format corresponding to the captured context-sensitive information in one or more social databases. Social database match determination module 212 may parse the data processed from the captured images to identify any evidences and signs of the first format. In an exemplary embodiment, social database match determination module 212 may determine the image-derived text captured in FIG. 4B to represent a first language of Chinese and a first format unique to the Chinese language. In making this determination, in one embodiment, social database match determination module 212 may consult one or more social databases as well as context-sensitive translation & reformatting data store 116 (FIG. 1) that may contain data on local languages and local formats corresponding to various GPS location areas throughout the world.

If after searching the social databases as well as context-sensitive translation & reformatting data store 116 (FIG. 1), social database match determination module 212 determines that a match cannot still be located, social network question generation module 214 may upload the first text having the first format to a social network and generate a query on the social network to seek inputs from a plurality of users on the social network to identify a first context corresponding to the first text based on the first format. Social network question generation module 214 may also generate a query associated with the first format that may be open to all social database users and social network users as moderated by a database administrator. With social collaboration, it is contemplated that the query may receive a thorough response in a timely fashion. Social database match determination module 212 may later determine the context of the first text based on the first context identified from inputs to the query received from the plurality of users, and store the context of the first text in a database. In one embodiment, after the database administrator's verification, the newly identified first context as a valid record to a social database such as context-sensitive translation & reformatting data store 116. If the response is still inadequate in identifying the input locale, context-sensitive translation & reformatting 104A and 104B may periodically query other online social databases and social networks that may possess archives of social collaborative knowledge where users may have contributed context-sensitive format information on an ongoing basis. To improve the search engine, the administrator may examine the response returned by social databases before the response is appended, indexed and archived to or through the context-sensitive translation & reformatting data store 116.

If at 306, social database match determination module 212 is unable to locate a match on the social database, after generating the new query, social database match determination module 212 may then leave the source format unchanged until such time an adequate response is received identifying the first format. And when an adequate response is received, social database match determination module 212 may transfer the same to output locale information determination module 216 at 308.

In instances where social database match determination module 212 determines that a first language and a first format that matches that of the image-derived text, at 307, social database match determination module 212 may update a database such as context-sensitive translation & reformatting data store 116 with such newly identified input locale format information. Social database match determination module 212 may utilize extension application interface module 220, to be explained later, to catalogue and index the new input locale format in or through a database such as context-sensitive translation & reformatting data store 116 and make it available for future use by context-sensitive translation & reformatting 104A and 104B.

At 308, output locale information determination module 216 may identify a second language and a second format corresponding to the first language and the first format by accessing one or more databases such as, for example, context-sensitive translation & reformatting data store 116. In one embodiment, output locale information determination module 216 may access context-sensitive translation & reformatting data store 116 to determine the second language and the second format based on a setting on computing device 102, such as a user-specified setting specifying an output locale. In one embodiment, context-sensitive translation & reformatting data store 116, which may include records of context-sensitive formats, may provide a second format that corresponds to the first format present in the first text. In addition, context-sensitive translation & reformatting data store 116 may also translate the first language of the first text to the second language.

At 309, locale format conversion module 218 may convert the context-sensitive information in the first text in a first language and a first format to a second language and a second format, as identified by output locale information determination module 216.

At 310, extension application interface module 220, which is an optional add-on module of context-sensitive translation & reformatting 104B, may provide additional services complementary to translating and reformatting of context-sensitive information. In one embodiment, extension application interface module 220 may represent a currency conversion add-on module that interacts with extension application 126 and social database interface application 124 (FIG. 1) to add a currency conversion feature to the translating and reformatting functions. In this embodiment, when a price tag in a first language and a first currency symbol associated with first format is identified by locale determination module 204, extension application interface module 220 may convert the price displayed in a first currency to a second currency indicated in a user-specified setting. The currency conversion may be performed in real-time based on latest currency exchange rates available online and accessible through extension application 126 and social database interface application 124. In another embodiment, extension application interface module 220 may permit a user to upload a yet to be identified input locale format to context-sensitive translation & reformatting data store 116 via extension application 126. Social database match determination module 212 may then catalogue and index the new input locale format in or through context-sensitive translation & reformatting data store 116, and make the new input locale format available for future use by context-sensitive translation & reformatting 104A and 104B. Extension application interface module 220 may also permit a user to include explanations to the new input locale format that may enhance a domain knowledge database containing archived context-sensitive formats and accessible by context-sensitive translation & reformatting data store 116.

At 311, converted format image display module 222 may generate an image of the translated and reformatted context-sensitive information in the second language and second format that is ready for display on GUI 108.

At 312, converted format image display module 222 may display the generated image of the translated and reformatted in the second language and second format. In one embodiment, converted format image display module 222 may generate an augmented reality (AR) visual presentation of the translated and reformatted information that may be overlaid on a real world image. In one embodiment, converted format image display module 222 may display both the original text and the translated and reformatted version alongside each other. In an exemplary embodiment, as shown in FIG. 4C, converted format image display module 222 may display the translated and reformatted text "Expiration date: Aug. 5, 2014" positioned over the position of the original text, where "Expiration date: Aug. 5, 2014" represents the context-sensitive information that has been translated and reformatted to a second language of U.S. English and a second format unique to U.S. English from a first language of Chinese and a first format unique to the Chinese language, based on a user-specified setting.

Figure 5A:
FIGS. 5A, 5B and 5C are diagrams showing how text from a real world image may be processed for use in the methods of the present invention, in accordance with one embodiment of the present invention.
Figure 5B:
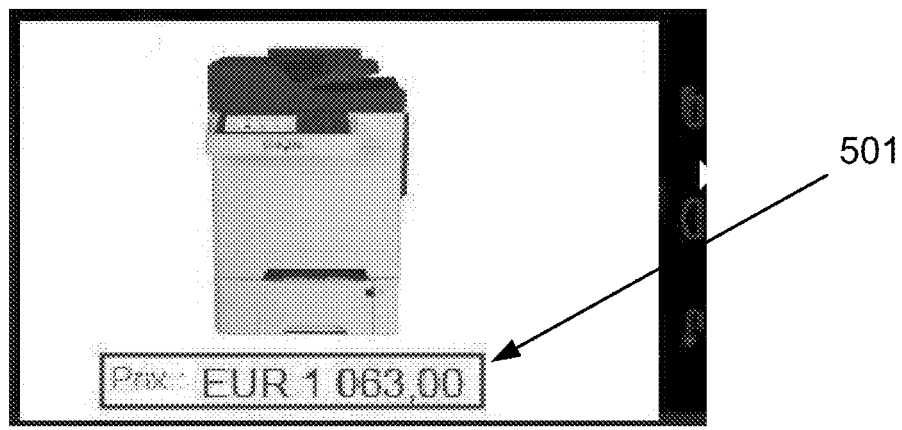
Figure 5C:

FIGS. 5A, 5B, and 5C represent translation and reformatting of a real world image from the French language to the Chinese language and from the Euro currency format to Chinese Yuan currency format, according to one embodiment of the present invention. In one embodiment, FIG. 5A displays article's price presented in the French language and in the Euro currency. The camera target box view 501 of camera 106 may be positioned to cover the text in the French language and in a currency format representing the Euro currency as shown in FIG. 5B. After the context-sensitive translation & reformatting 104A and 104B translates and reformats the captured context-sensitive information from the French language to the Chinese language, extension application interface module 220 may convert the price in the Euro currency to an equivalent price in the Chinese Yuan currency based on a latest currency exchange rate available from an online database.

Contemplated examples of first and second languages that may be involved in practicing the present invention include Chinese, Korean, Japanese, Vietnamese, Khmer, Lao, Thai, English, French, Spanish, German, Italian, Portuguese, Russian, Hindi, Greek, Hebrew, and Arabic. Other human languages not listed here are also contemplated to be within the scope of the present invention, as would be recognized by one of ordinary skill in the art.

Based on the foregoing, a computer system, method, and computer program product have been disclosed. However, numerous modifications and substitutions can be made without deviating from the scope of the present invention. Therefore, the present invention has been disclosed by way of example and not limitation.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 6:
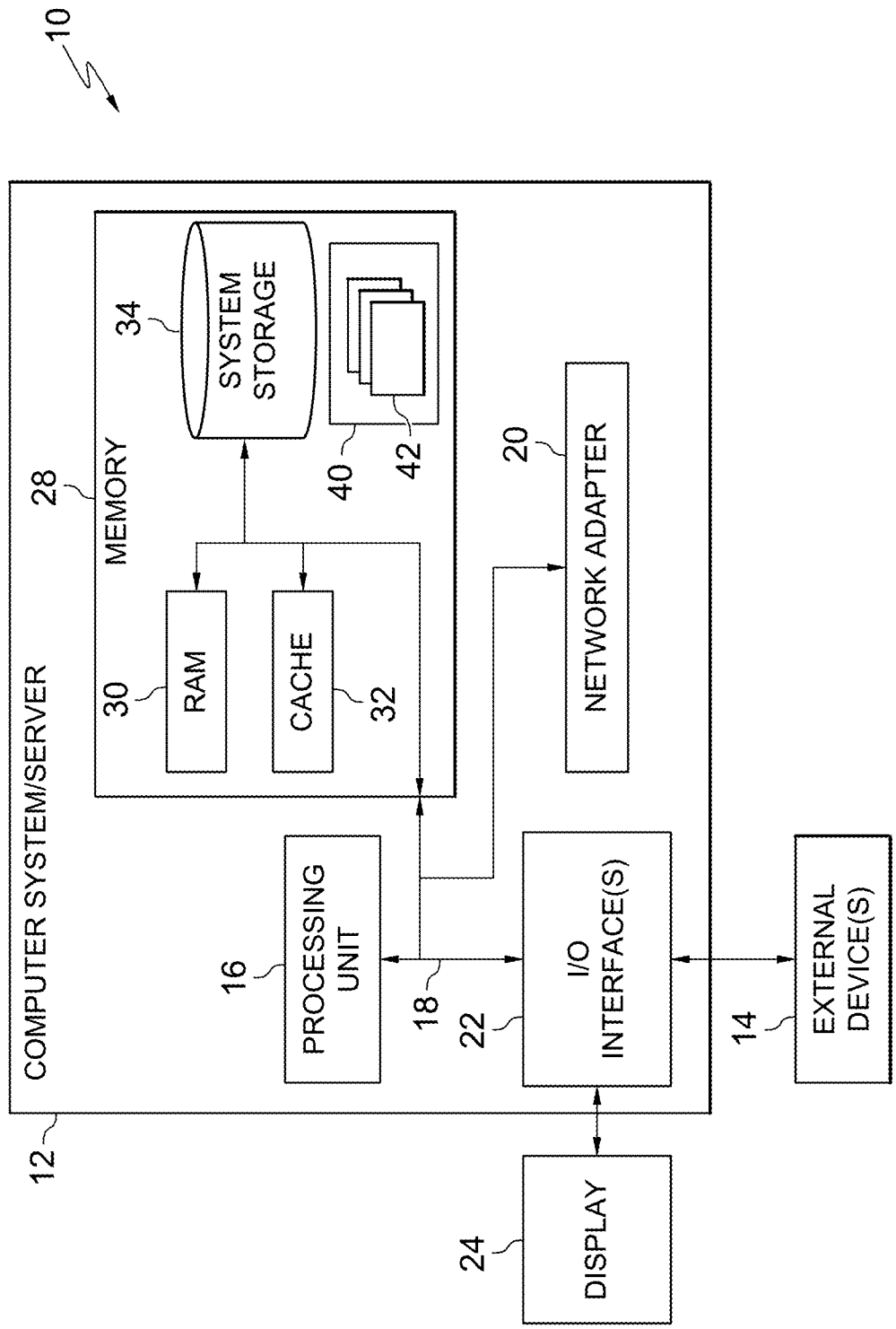
FIG. 6 is a functional block diagram illustrating a cloud computing node according to one embodiment of the present invention.

Referring now to FIG. 6, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 6, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 7:
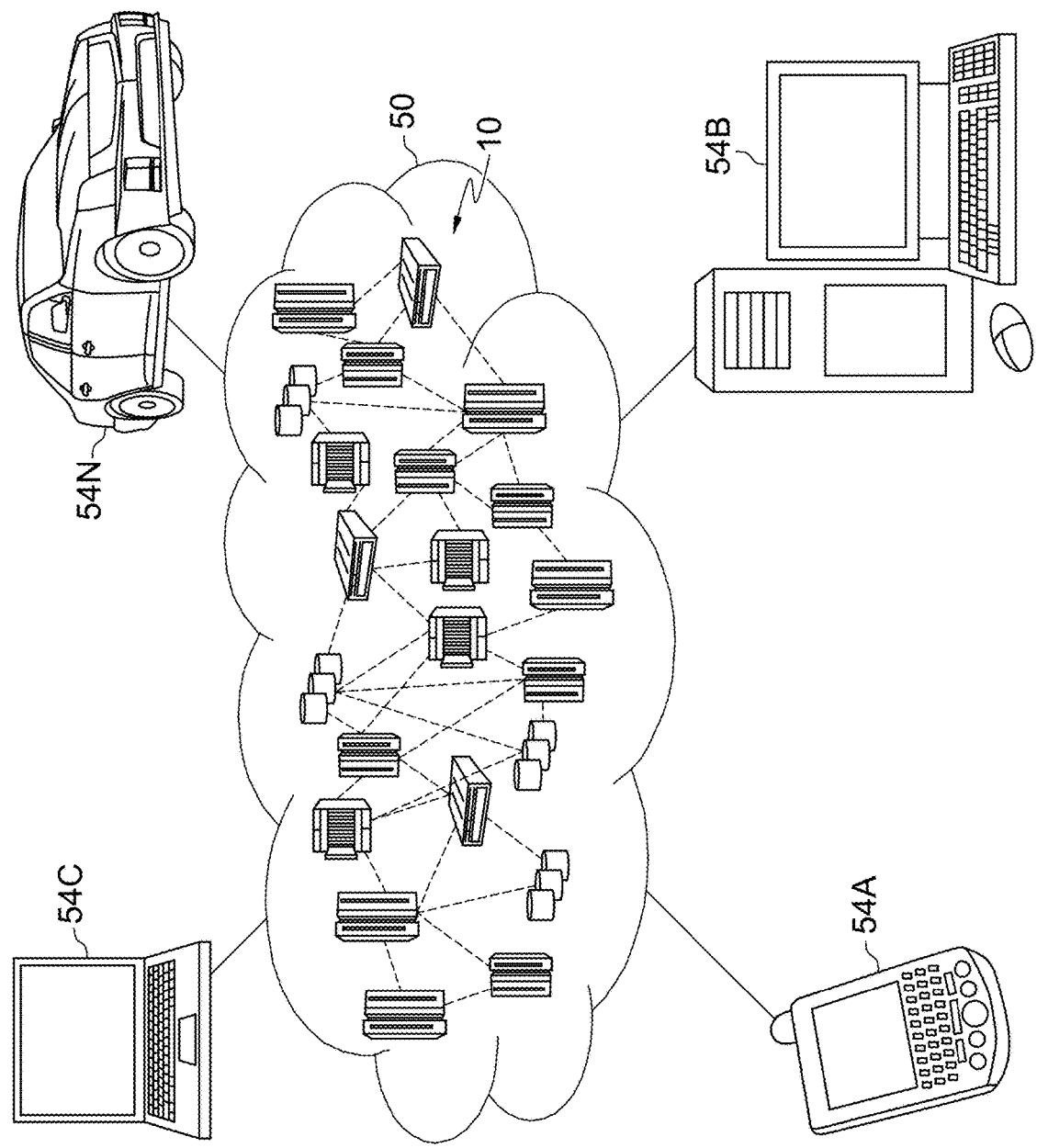
FIG. 7 is a functional block diagram illustrating a cloud computing environment according to one embodiment of the present invention.

Referring now to FIG. 7, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
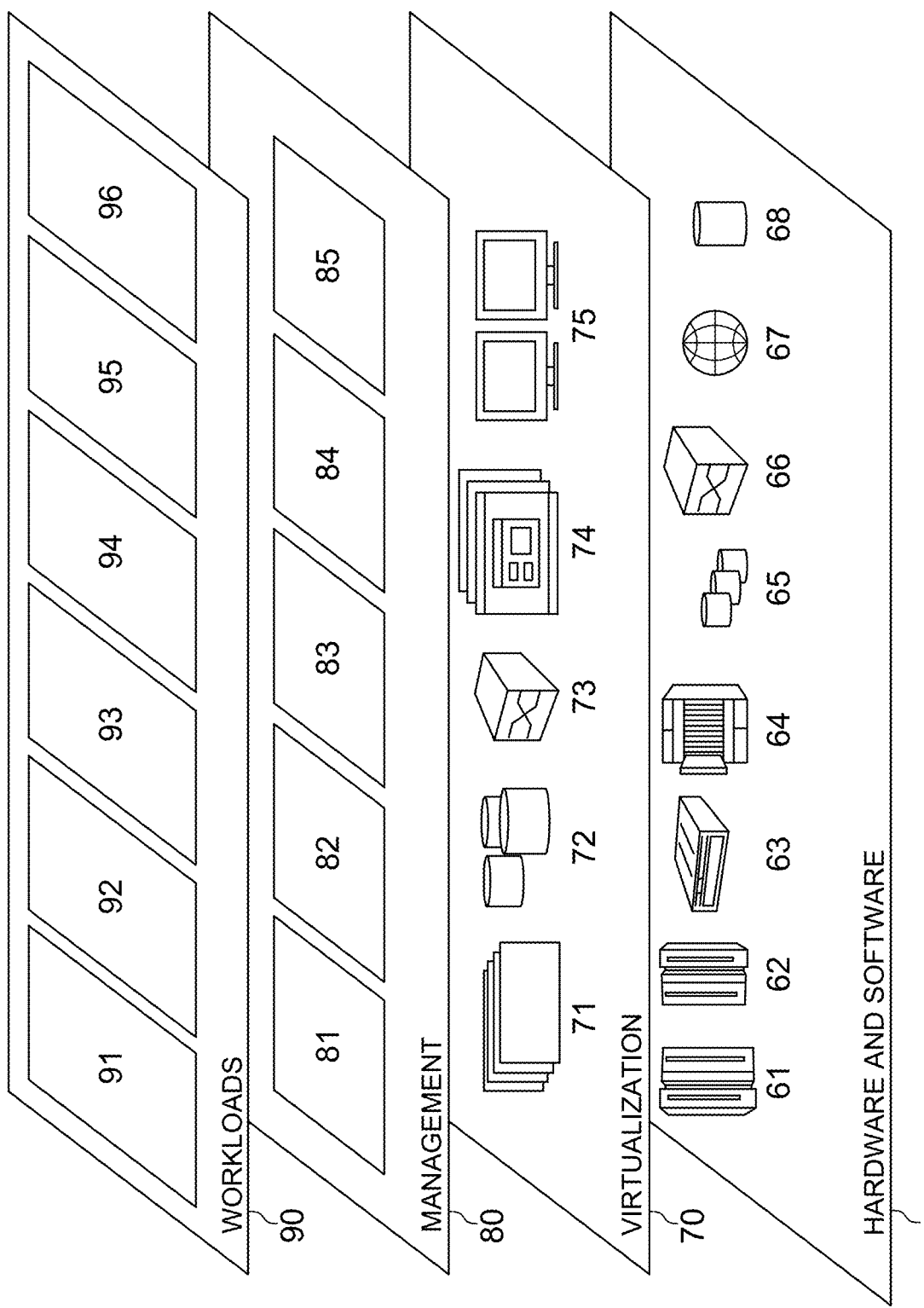
FIG. 8 is a functional block diagram illustrating abstraction model layers according to one embodiment of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, context-sensitive translation & reformatting 96.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The many features and advantages of the present invention are apparent from the written description, and thus, it is intended by the appended claims to cover all such features and advantages of the invention. Further, since numerous modifications and changes will readily occur to those skilled in the art, it is not desired to limit the invention to the exact construction and operation as illustrated and described. Hence, all suitable modifications and equivalents may be considered to fall within the scope of the invention.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer program product for reformatting a text phrase, the computer program product comprising:
   one or more computer-readable storage media and program instructions stored on the one or more computer-readable storage media, the program instructions being executable by a processor of a computer to perform a method, the program instructions comprising:
   program instructions to capture on an object a first text having a first text format, wherein the first text is captured by a camera and object scan module;
   program instructions to identify a context of the first text based on the first text format, the context comprising information identifying a domain of the first text, wherein the program instructions to identify the context is based on an abbreviation, a cosmetic product batch number and a notation specific to a social group, wherein the social group includes users having common interests and characteristics within a social network;
   program instructions to parse the identified context of the first text based on the first text format to search a database to locate a representative second text with a second text format, wherein the first text format and the second text format are context-sensitive formats;
   program instructions to convert the first text in the first text format to the representative second text in the second text format, wherein the representative second text is a translated and a language text reformatted version of the first text, wherein the conversion of the first text format to the representative second text format includes rearrangement of the second text based on the context-sensitive format of the second text, wherein the second text format is based on a user specified setting; and program instructions to display the second text format associated with the context.

2. The computer program product of claim 1, wherein execution of the program instructions to convert the first text from the first text format to the representative second text in the second text format is triggered based on identifying the context of the first text.

3. The computer program product of claim 1, wherein the program instructions to display the second text format associated with the context further comprises:

program instructions to display the translated, reformatted and rearranged second text over a position of the first text on the object.

4. A computer system for reformatting a text phrase, the computer system comprising:

one or more computer processors;

one or more computer-readable storage media;

program instructions to capture on an object a first text having a first text format, wherein the first text is captured by a camera and object scan module;

program instructions to identify a context of the first text based on the first text format, the context comprising information identifying a domain of the first text, wherein the program instructions to identify the context is based on an abbreviation, a cosmetic product batch number and a notation specific to a social group, wherein the social group includes users having common interests and characteristics within a social network;

program instructions to parse the identified context of the first text based on the first text format to search a database to locate a representative second text with a second text format, wherein the first text format and the second text format are context-sensitive formats;

program instructions to convert the first text in the first text format to the representative second text in the second text format, wherein the representative second text is a translated and a language text reformatted version of the first text, wherein the conversion of the first text format to the representative second text format includes rearrangement of the second text based on the context-sensitive format of the second text, wherein the second text format is based on a user specified setting; and program instructions to display the second text format associated with the context.

5. The system of claim 4, further comprising:
program instructions to identify a first language associated with the first text; and program instructions to translate the first text from the first language to a second language.

6. The system of claim 4, wherein the program instructions to identify the context is based on one or more of a location, format, sign, color, icon, currency symbol, date, time, and metadata associated with the first text.

7. The system of claim 4, further comprising:

program instructions to display the first text in the second text format as an image on a display device of a computing device in real-time.

8. The system of claim 4, wherein the program instructions to convert the first text from the first text format to the second text format comprises:

program instructions to search a database to locate the second text format that corresponds to the first text format.

9. The system of claim 4, wherein the program instructions to identify the context comprises:

program instructions to search a social database to find one or more texts having formats matching the first text format;

program instructions to identify a first context corresponding to the one or more texts; and program instructions to determine the context of the first text based on the first context corresponding to the one or more texts.

10. The system of claim 4, further comprising:

program instructions to capture an image, of one or more of a label and a logo located within a defined proximity to the first text, with an image capturing device;

program instructions to search a social database to find one or more of labels and logos matching those in the captured image;

program instructions to identify a first context corresponding to the one or more matching labels and logos; and program instructions to determine the context of the first text based on the first context corresponding to the one or more matching labels and logos.

11. The system of claim 4, wherein the program instructions to convert to the second text format is based on a user-specified setting on a computing device.

12. The system of claim 4, wherein execution of the program instructions to convert the first text from the first text format to the representative second text in the second text format is triggered based on identifying the context of the first text.

13. The system of claim 4, wherein the program instructions to display the second text format associated with the context further comprises:

program instructions to display the translated, reformatted and rearranged second text over a position of the first text on the object.

* * * * *